(12) United States Patent  
Taylor

(10) Patent No.: US 6,516,753 B1
(45) Date of Patent: Feb. 11, 2003

(54) ANIMAL GROOMING STATION

(75) Inventor: Ted D. Taylor, Gilbert, AZ (US)

(73) Assignee: Farnam Companies, Inc., Phoenix, AZ (US)

( * ) Notice: Subject to any disclaimer, the term of this patent is extended or adjusted under 35 U.S.C. 154(b) by 0 days.

(21) Appl. No.: 09/910,338

(22) Filed: Jul. 23, 2001

(51) Int. Cl.[7] .............................................. A01K 13/00
(52) U.S. Cl. ....................... 119/756; 119/753; 119/755; 119/600
(58) Field of Search ................................ 119/600, 752, 119/753, 754, 755, 756, 757, 676

(56) References Cited

U.S. PATENT DOCUMENTS

| | | | | |
|---|---|---|---|---|
| 2,804,845 A | * | 9/1957 | Plumley et al. | |
| 2,902,976 A | * | 9/1959 | Wilson | 119/416 |
| 3,120,936 A | * | 2/1964 | Brauning | 246/169 R |
| 3,145,692 A | * | 8/1964 | Litwiller | 119/753 |
| 3,266,464 A | * | 8/1966 | Davis | 119/756 |
| 3,524,434 A | * | 8/1970 | Finley | 119/756 |
| 3,744,457 A | * | 7/1973 | Heine et al. | 119/756 |
| 3,892,204 A | * | 7/1975 | Belkin | 119/755 |
| 4,570,577 A | * | 2/1986 | Bellinger | 119/725 |
| 5,488,926 A | * | 2/1996 | Hunt | 108/133 |
| 5,513,598 A | * | 5/1996 | Zapparoli | 119/600 |
| 5,960,746 A | * | 10/1999 | Salts | 119/756 |
| 6,058,888 A | * | 5/2000 | Nichols | 119/702 |

* cited by examiner

Primary Examiner—Yvonne R. Abbott

(57) ABSTRACT

An animal grooming station wherein a bracket having an animal retaining loop depending therefrom is coupled to a moveable arm attached to a table by a rotational bearing. The axis of rotation of the bearing is in vertical alignment with the retaining loop. Movement of the bracket about the table does not change the position of the retaining loop. The table is contoured to aid in movement of the bracket.

14 Claims, 3 Drawing Sheets

ANIMAL GROOMING STATION

BACKGROUND OF THE INVENTION

This invention relates to an animal grooming station end, in particular, to an animal grooming station wherein the animal restraint is mounted on a moveable bracket so as to reduce interference with the grooming process.

The increasing pet population in the United States has greatly expanded the market for grooming aides including stations wherein the animal is positioned on an elevated work surface for ease of grooming. Animals by nature are active and need a measure of restraint during grooming. The elevation above ground level coupled with the level of activity proximate to the head of the animal heightens the natural tendency of the animal to remain active. The groomer to be effective is desirous of maintaining a calm and quiet environment with minimal movement about the animal to aide in maintaining the animals calm demeanor. Typically, the animal is placed on the elevated work surface and a retaining loop is positioned behind the animals head. The retaining loop depends from an overhead bracket mounted on the table. The retaining loop overlays a central region of the table containing the work site and aids in keeping the animal still. Normally, the loop is adjustable to prevent the animal from withdrawing his head.

During the grooming process, not only is the operator required to move about the table to groom the animal, a fixed bracket holding the retainer requires that the groomer either reposition the animal or operate from a number of awkward positions in order to have access to the entire animal. Continued movement of the groomer and repositioning of the animal often causes the animal to move at random at the work surface. These unpredictable movements increase the length of time needed to groom the animal and often diminish the desired results. This problem can be severe with temperamental animals. Frequently, these animals are groomed at locations wherein a high degree of activity is taking place further adding to the likelihood that the animal will move unpredictably.

Accordingly, the present invention is directed to a grooming station using an elevated table wherein the groomer can complete the operation without interference from the bracket holding the retaining loop. The subject invention provides a bracket that moves about the periphery of the table while maintaining a fixed position for the animal retainer above the work site. The configuration of the table is such that the bracket can be moved throughout an arc greater than 180° so as to increase the access to the animal. As a result, the groomer now has the ability to complete a grooming operation without repositioning the animal thereby decreasing the chance that the animal will engage in random movement.

SUMMARY OF THE INVENTION

The present invention concerns an animal grooming station having an elevated table with a central region upon which an animal is positioned for subsequent grooming. The animal is aided in maintaining a position in the central region by a retainer which is typically looped about the animal and is attached to the free end of an overhanging bracket. The bracket is spaced from the table and extends outwardly beyond the periphery of the table.

The bracket extends outside the table down to a moveable arm having first and second ends with the first end coupled to the bracket. The second end of the moveable arm extends beneath the central region of the support table to a rotational coupling. The coupling is mounted on the underside of the support table in vertical alignment with the retainer. Thus, the moveable arm is capable of rotation and the bracket moves correspondingly. By aligning the axis of rotation in the rotational coupling with the retainer attached to the free end of the bracket, the rotation of the bracket about the table occurs without a lateral displacement of the retainer. Thus, the groomer can position the bracket at desired points about the table without having to reposition the animal during the grooming process.

The table is provided with a curvilinear outline and preferably a narrowed mid-section to facilitate rotation of the movable arm about a large arc. In operation, the expanded angle of rotation of the moveable arm and bracket permits the groomer to have access to the entire body of a small to mid-size animal. To reduce the opportunity for the animal to be affected by movement of the bracket, the free end of the bracket and the retaining loop are provided with a swivel therebetween that permits corresponding rotation of the retainer.

Further features and advantages of the invention will become more readily apparent from the following detailed description of a preferred embodiment when taken in conjunction with the accompanying drawings.

DESCRIPTION OF THE PREFERRED EMBODIMENT

Figure 1:
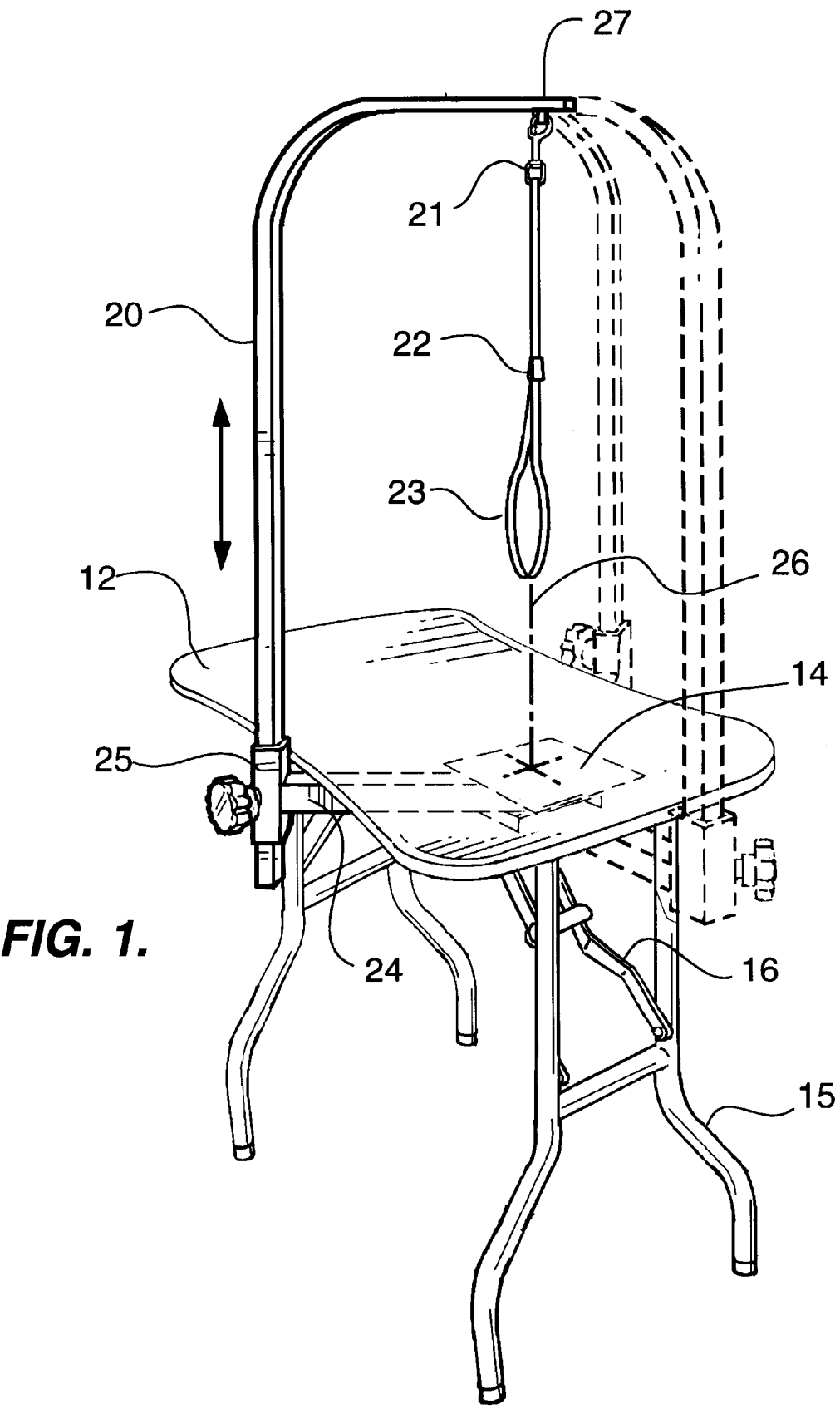
FIG. 1 is a perspective view showing a preferred embodiment of the invention.

The animal grooming station shown in FIG. 1 includes an elevated table 12 supported by a pair of opposing collapsible legs 15 maintained in position by conventional locking mechanism 16. The central region 14 within which the animal is to be positioned for grooming and will be maintained in that position by the retainer 23 is shown proximate to one end of the table. The table is shown with a curvilinear peripheral outline and has a reduced width mid-section for reasons that will be later discussed.

A moveable arm 24 is shown extending outwardly from the central region 14 and is terminated by a hollow vertical tubular section 25. The tubular section receives the lower end of bracket 20 which extends upwardly to a free end 27 which overlays the central region 14. A swivel 21 is attached to the free end of the bracket and to the adjustable retaining loop 23 which depends therefrom. An adjustable clamp 22 is provided in the retaining loop to allow it to be fitted over the head of different size animals and adjusted to be reduced in size about their neck or torso.

In operation, the animal to be groomed is placed upon the table 12 on or near the central region 14. The retaining loop is placed about the animal and tightened to the desired degree by the use of clamp 22. The bracket 20 is moved initially to the side position and raised or lowered to the desire height and the animal is postured according to the plan of grooming. As the groomer works about the animal, the bracket is moved to different positions about the periphery of the table as shown by the dashed lines in FIG. 1. Thus, the bracket does not impede the movements of the groomer in dealing with the tasks at hand.

Figure 2:
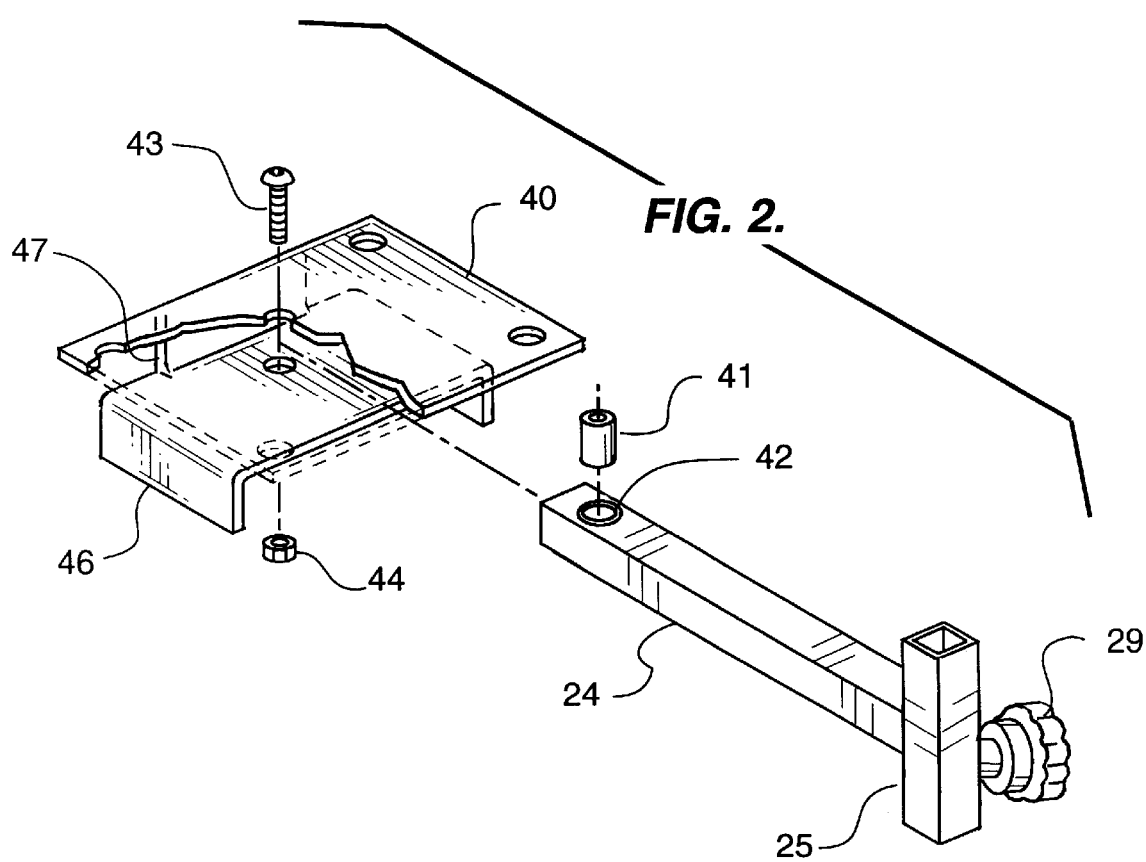
FIG. 2 is an exploded view showing the rotational coupling used in the embodiment in FIG. 1.

The movement of the bracket to the different positions about the table 12 takes place without lateral displacement of the retainer 23. This fixed position for the retainer results from the vertical alignment of the axis of rotation of the bearing mounted between the support plates shown in FIG. 2 with the retainer. As seen in FIG. 2, support plate 40 is provided with holes for attachment to the underside of table 12. A cylindrical bearing 41 is received in bushing 42 of arm 24. The bearing length exceeds the length of bushing to provide clearance during rotation of the moveable arm. A second support plate 46 shown attached to support 40 by flange 47 receives bolt 43. The bolt extends through the bearing 41 and is fastened at the underside of support 46 by retaining nut 44. As shown in FIG. 2, the moveable arm 24 is capable of 360° rotation about bearing 41. However when installed, the receiver 25 extends vertically to the level of the surface table so that the receiver contacts the edge of table 12 to limit the arc of rotation. To secure the bracket in the receiver 25, a threaded member with handle 29 is provided to frictionally engage the bracket.

Figure 4:
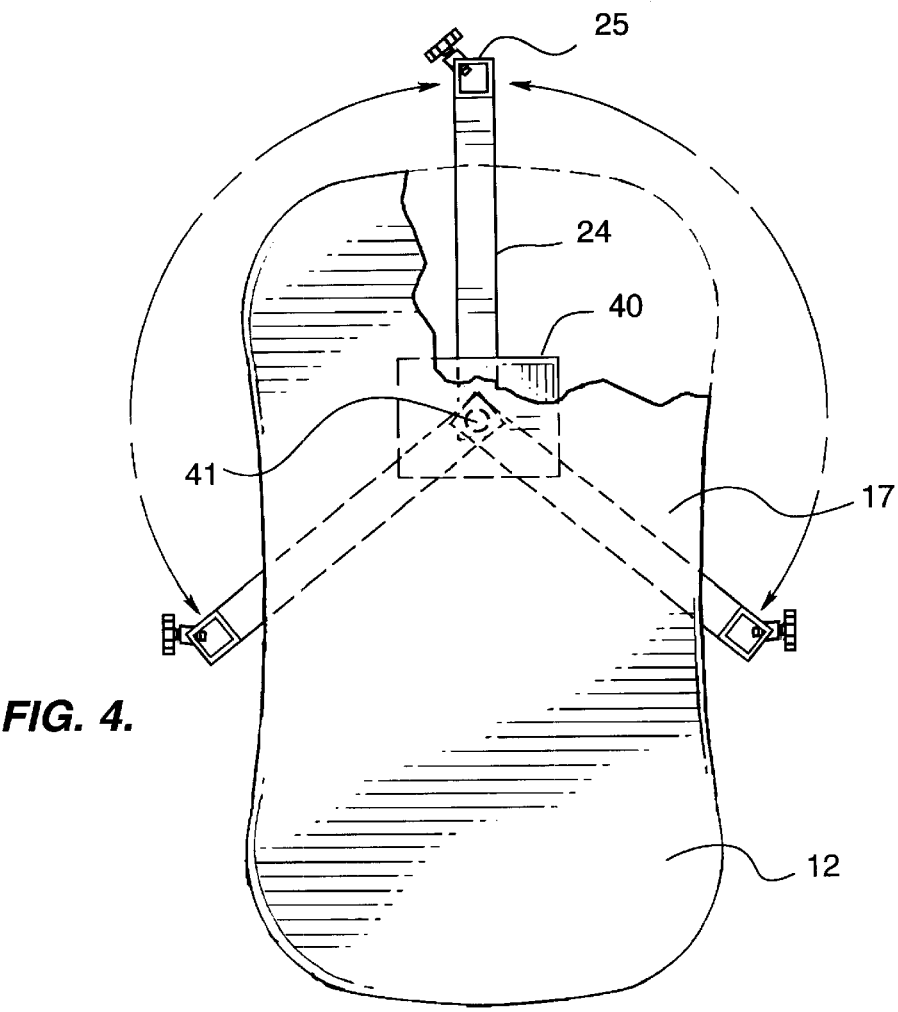
FIG. 4 is a plan view showing the outline of the table of the preferred embodiment of FIG. 1.

The movement of the bracket about the table 12 is seen more clearly in FIG. 4 wherein the curvilinear outline of the table is contoured to provide a reduced width for midsection region 17. The moveable arm 24 is shown in its central or mid-rotational position. The mounting plate 40 is seen through the broken away portion of table 12. The limits of rotation for the moveable arm 24 are shown by the dashed outlines. In FIG. 4, the bracket 20 has been removed from the receiver 25 for purposes of illustration. By reducing the width of the mid-section of table 12, the angle of rotation of the moveable arm can be increased. In the preferred embodiment, the angle of rotation is about 250 degrees to permit the groomer to have access to the entire body of the animal. The remaining portion of the work surface is used to receive the various grooming aides and appliances employed.

Figure 3:
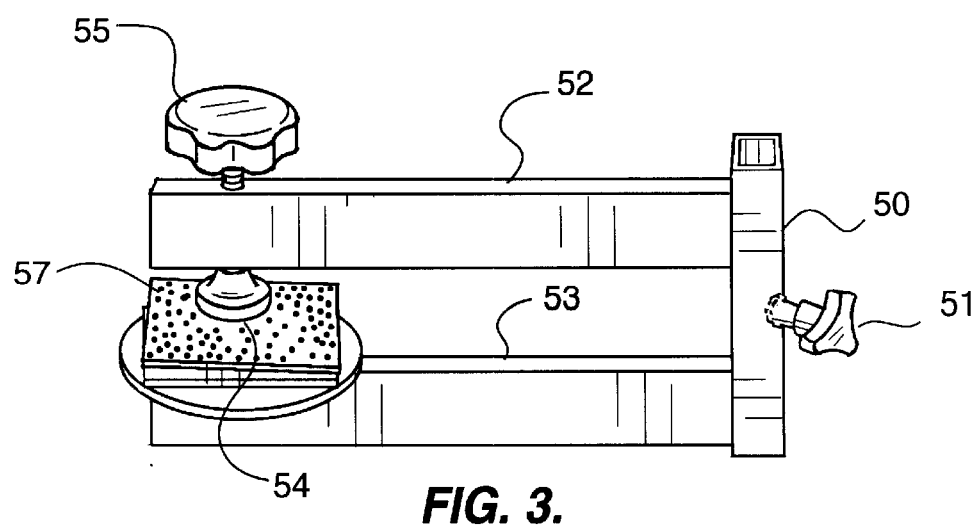
FIG. 3 is a perspective view of an alternative embodiment of the invention.
Figure 5:
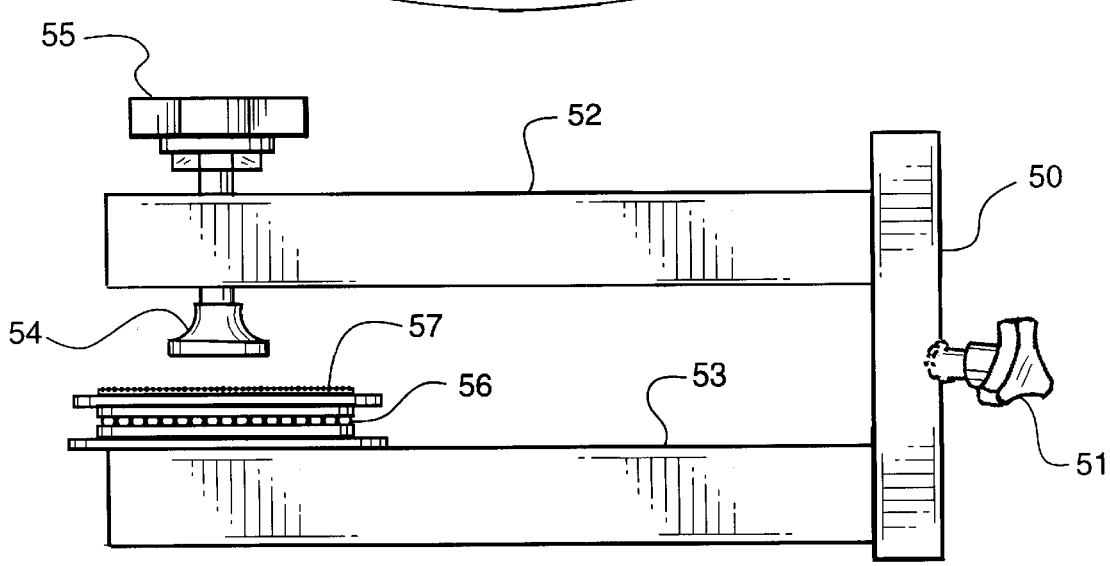
FIG. 5 is a side view showing the alternative embodiment of FIG. 3.

The foregoing description has referred to a rotational coupling mounted on the underside of the support table. An alternative embodiment utilizes a removable rotational coupling as shown in FIGS. 3 and 5. In this embodiment, first and second bearing support arms 52, 53 are attached to an elongated receiver 50. The bracket 20 as shown in FIG. 1 is slidably received in tubular receiver 50 and held in the desired position by the tightening of handle 51. The table is inserted between the first bearing 54 and the contact pad 57 attached to the first and second support arms 52, 53. The handle 55 is tightened until the bearing 54 contacts the work surface of the table. As shown in FIG. 3, the contact pad is a large area pad and this is attached to a rotational bearing having a circular race 56. Thus, the receiver can be rotated about the vertical axis extending through the center of bearing 54. The bracket will rotate along with the receiver 50. Since the attachment for the retainer 23 is vertically aligned with the bearing 54 it does move from the axis of rotation. This configuration enables the groomer to place the bracket at different points on the work table periphery for different applications.

The present invention enables the groomer to work on the subject animal without interference from a stationery bracket. Consequently, the groomer can normally complete the entire grooming process on an animal without having to alter or compromise the desired grooming movements. In addition, the repositioning of the animal to compensate for the obstruction created by a fixed bracket is essentially eliminated. The advantages of the present invention accrue to both the groomer and the subject animal.

While the foregoing description has been with reference to a preferred embodiment of the invention, it is to be noted that variations and modifications may be made therein without departing from the scope of the invention.

What is claimed is:

1. an animal grooming station which comprises:
   a. a table for receiving an animal thereon;
   b. a rotational coupling attached to the underside of said table;
   c. a moveable arm having first and second ends, the second end extending beneath the table for attachment to the rotational coupling, the first end extending outwardly from the table for movement thereabout;
   d. a bracket attached to the first end of the arm and having a free end extending over a central region of said table; and
   e. a retainer attached to the free end of the bracket for engaging an animal positioned in the central region of the support table, the rotation of the bracket about the table taking place without lateral displacement of the retainer.

2. The animal grooming station of claim 1 wherein said rotational coupling includes:
   a. a mounting plate affixed to the work table and underlying the central region thereof;
   b. a bearing affixed to the plate having an axis of rotation aligned with said retainer;
   c. a bushing mounted in the moveable arm for receiving the bearing therein.

3. The animal grooming station of claim 2 wherein said rotational coupling further includes a securing plate spaced adjacent the mounting plate, said bearing mounted between the securing plate and the mounting plate.

4. The animal grooming station of claim 3 further comprising a receiver mounted on the first end of the moveable arm, said receiver adjustably receiving the bracket therein.

5. The animal grooming station of claim 4 further comprising a fastener affixed to the receiver for removably securing the bracket therein.

6. The animal grooming station of claim 5 wherein said support table has a curvilinear periphery.

7. The animal grooming station of claim 6 wherein said support table has a narrowed mid-section to facilitate rotation of the movable arm about the central region of the table.

8. The animal grooming station of claim 7 wherein the movable arm has an angle of rotation of about 250 degrees about the central region.

9. The animal grooming station of claim 8 wherein the free end of the bracket is provided with a swivel to permit rotation of the retainer.

10. An animal grooming station of the type having an elevated table having a work surface thereon and a support bracket having a retainer for limiting movement of the animal on the work surface, the retainer being positioned over a work site on said surface, the improvement comprising:
   a) a rotational coupling affixed to the table and located beneath the work surface in vertical alignment with said retainer; and
   b) a laterally extending arm connected between the rotational coupling and the support bracket whereby the retainer remains positioned over the work site upon movement of the support bracket along the edge of the work surface.

11. In the animal grooming station of claim 10, the improvement wherein the rotational coupling includes:
 a) first and second adjacently spaced bearing support plates, said first support plate attached to the table;
 b) a bearing secured between the support plates in vertical alignment with said retainer, and
 c) a bushing located in the arm and receiving the bearing therein.

12. In the animal grooming station of claim 10, the improvement wherein the rotational coupling includes:
 a) first and second adjacently spaced bearing support arms for receiving the table therebetween;
 b) a first bearing affixed to the first support arm and contacting the work surface; and
 c) a second bearing affixed to the second support arm, and
 d) a contact pad affixed to the second bearing for contacting the table, the alignment of the bearings with the retainer causing the retainer to remain positioned over the work site during movement along the edge of the work surface.

13. An animal grooming station which comprises:
 a. a table having a curvilinear periphery with a central region for positioning the animal thereon;
 b. a support bracket mounted for movement about the periphery of the table said bracket having a free end extending over the central region;
 c. an animal retainer attached to the free end of the bracket and extending downwardly toward the central region; and
 d. rotational means coupled to the support bracket for providing rotation of the support bracket about an axis, the alignment of the animal retainer and said axis being fixed during rotation of the support bracket about the periphery of the table.

14. The animal grooming station of claim 13 wherein said table has a narrowed mid-section to permit rotation of the support bracket through an arc of at least 210 degrees.

\* \* \* \* \*